(12) United States Patent
Mayercik et al.

(10) Patent No.: US 6,461,053 B1
(45) Date of Patent: Oct. 8, 2002

(54) OPTICAL CONNECTOR HAVING MULTIPLE MODULAR HOUSINGS

(75) Inventors: Paul Michael Mayercik, Hershey, PA (US); Robert Ney Weber, Hummelstown, PA (US); Edmund Joseph Haley, Dillsbury, PA (US); Lee Andrew Barkus, Millersburg, PA (US)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 09/416,875

(22) Filed: Oct. 13, 1999

(51) Int. Cl.[7] ............................................... G02B 6/38
(52) U.S. Cl. ............................. 385/56; 385/59; 385/71
(58) Field of Search ........................ 385/53–56, 58–60, 385/70–72, 75–78

(56) References Cited

U.S. PATENT DOCUMENTS

| | | | | |
|---|---|---|---|---|
| 5,506,922 A | * | 4/1996 | Grois et al. | 385/75 |
| 5,796,896 A | * | 8/1998 | Lee | 385/59 |
| 6,076,975 A | * | 6/2000 | Roth | 385/76 |
| 6,116,788 A | * | 9/2000 | Melchior et al. | 385/59 |
| 6,116,790 A | * | 9/2000 | Vergeest | 385/75 |
| 6,220,762 B1 | * | 4/2001 | Kanai et al. | 385/53 |
| 6,261,006 B1 | * | 7/2001 | Selfridge | 385/56 |

FOREIGN PATENT DOCUMENTS

| | | | | |
|---|---|---|---|---|
| WO | WO-98/00741 | * | 1/1998 | G02B/6/36 |

* cited by examiner

*Primary Examiner*—John D. Lee
*Assistant Examiner*—Sarah U Song

(57) ABSTRACT

The present invention provides an optical interconnection system capable of connecting a plurality of optical array connectors between assemblies. The optical array connectors are arranged to minimize the board real estate occupied by the assembly. Safety features are provided for preventing light from escaping in both the mated and unmated condition.

10 Claims, 8 Drawing Sheets

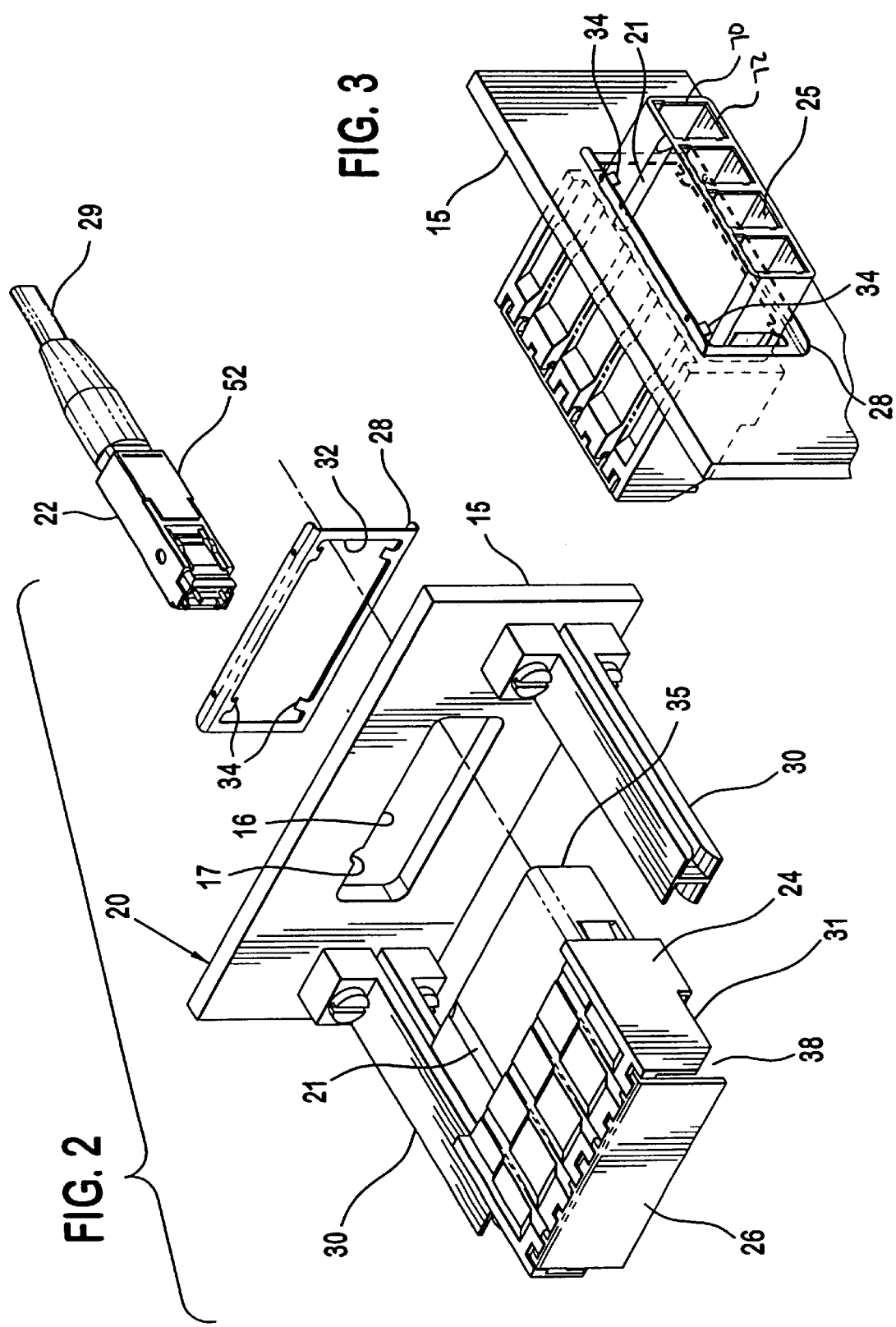

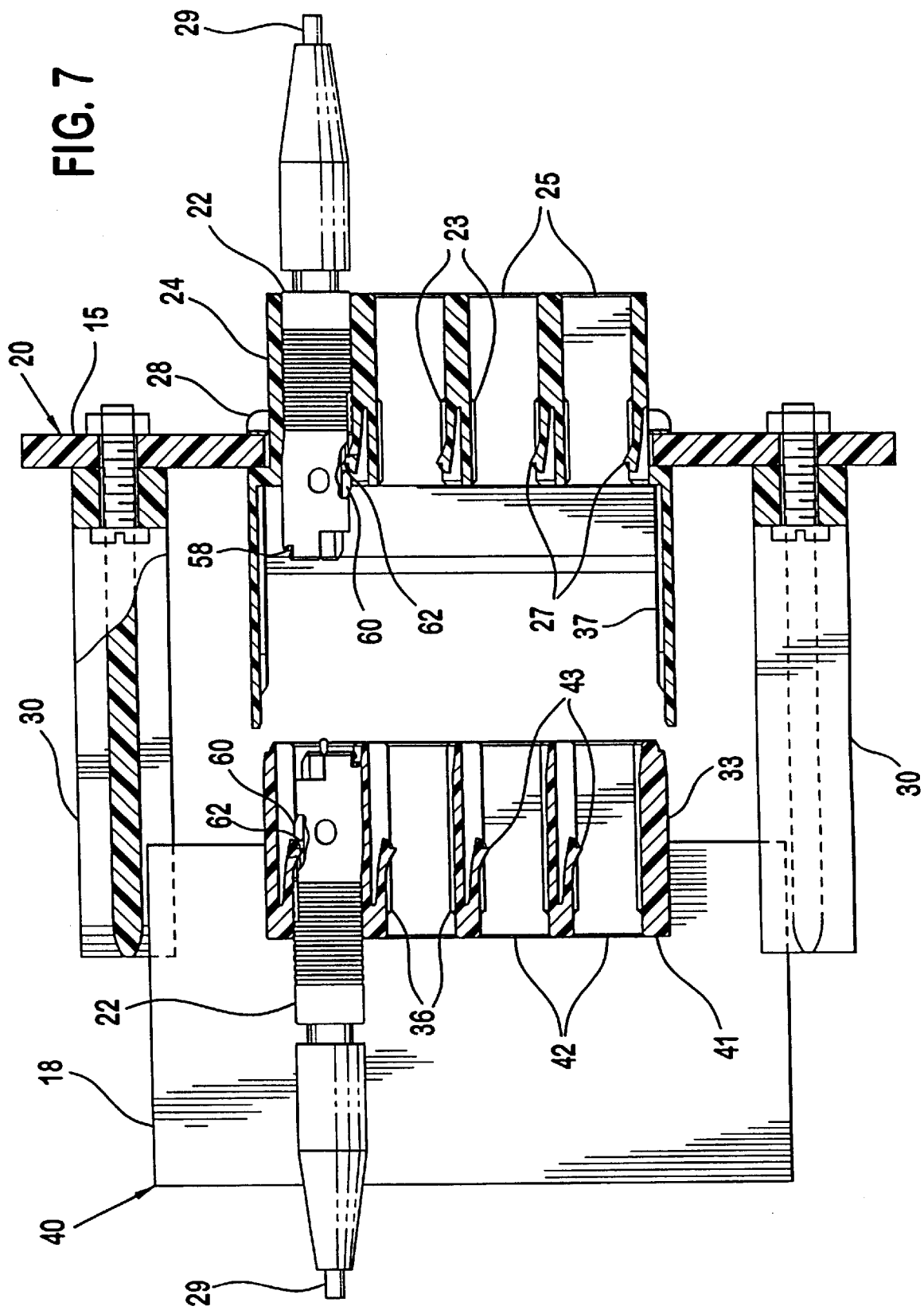

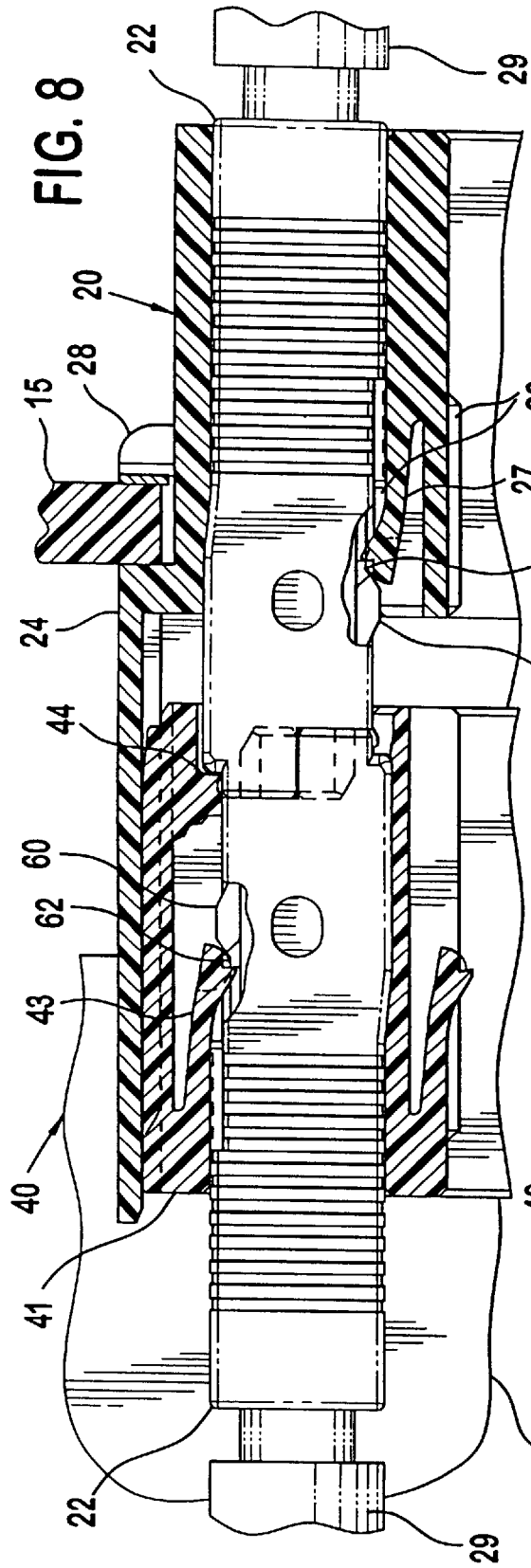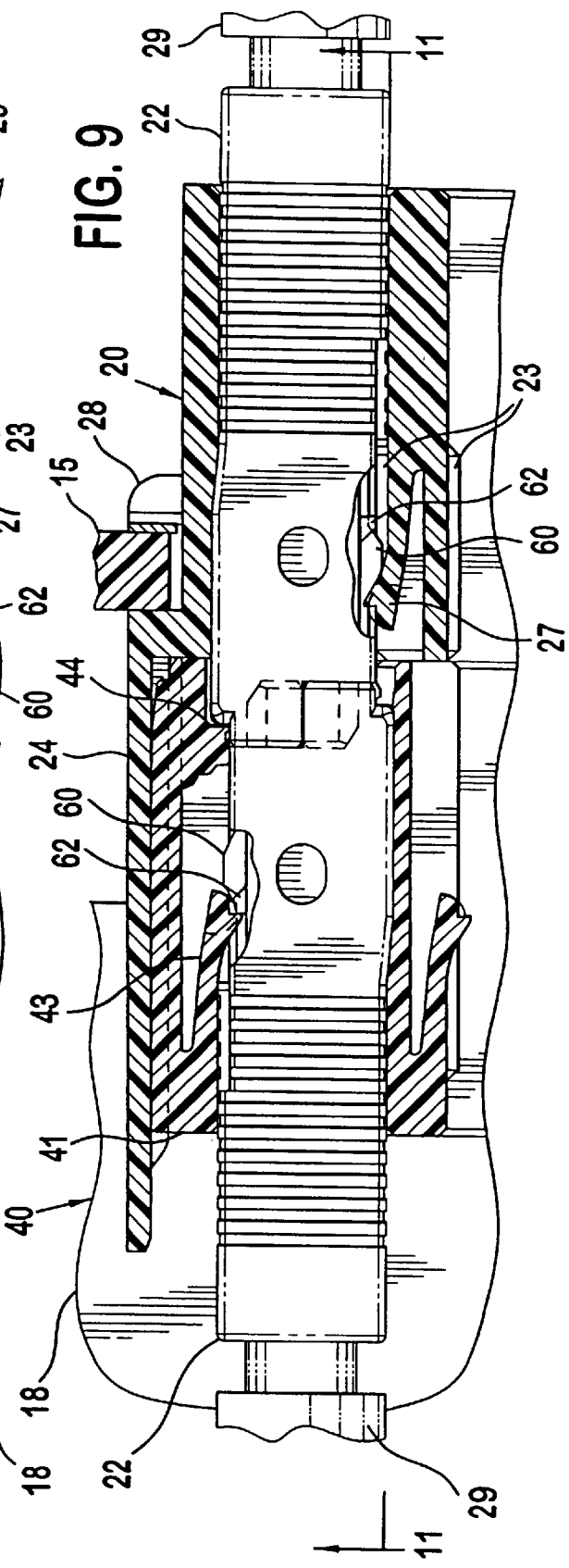

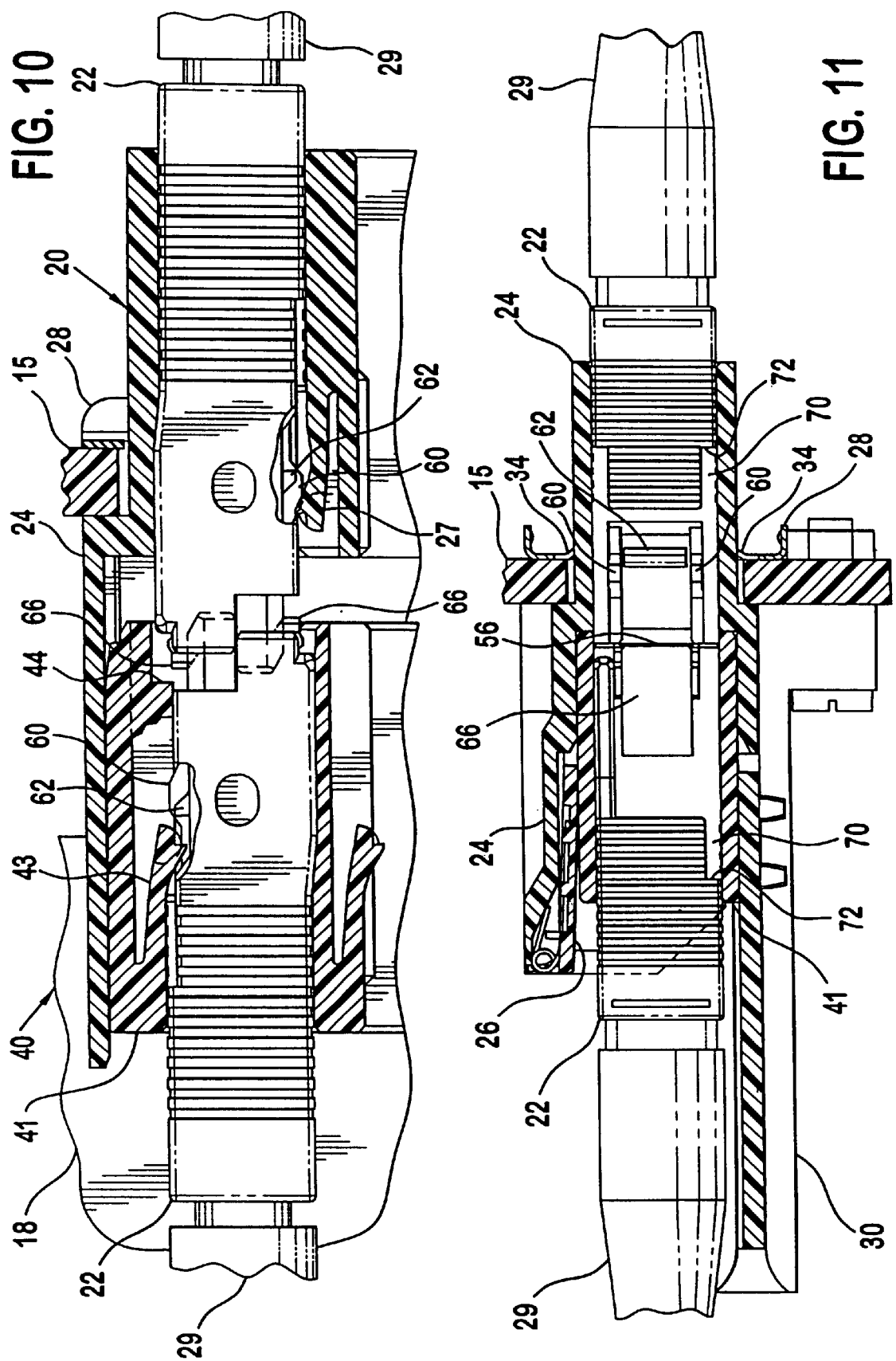

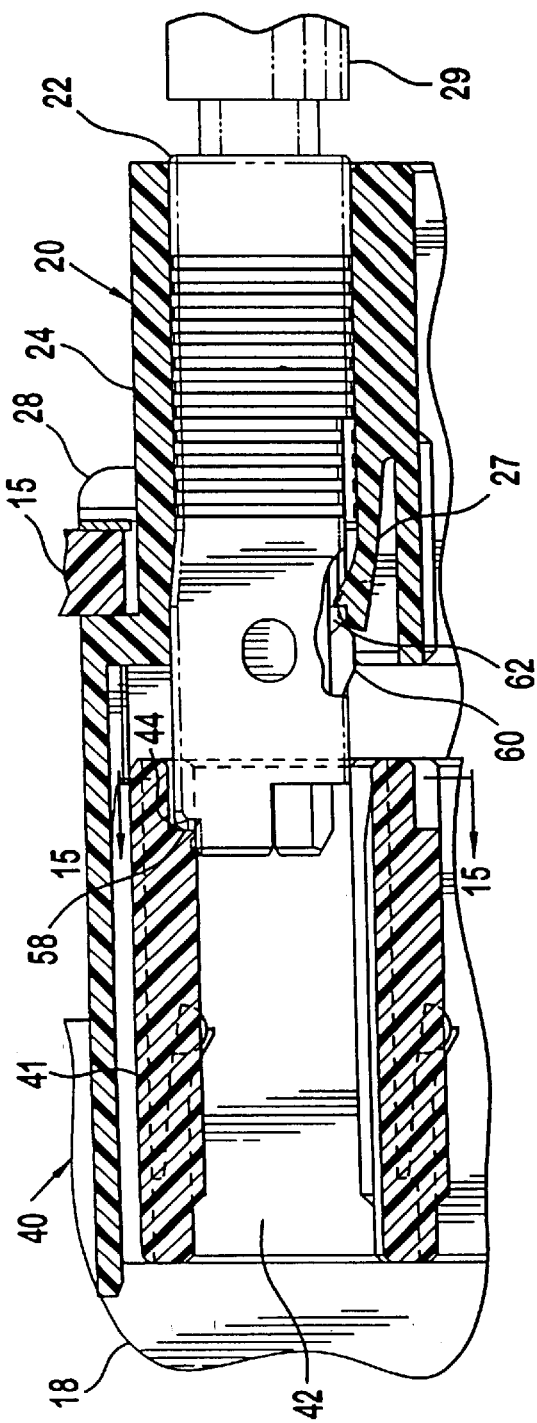
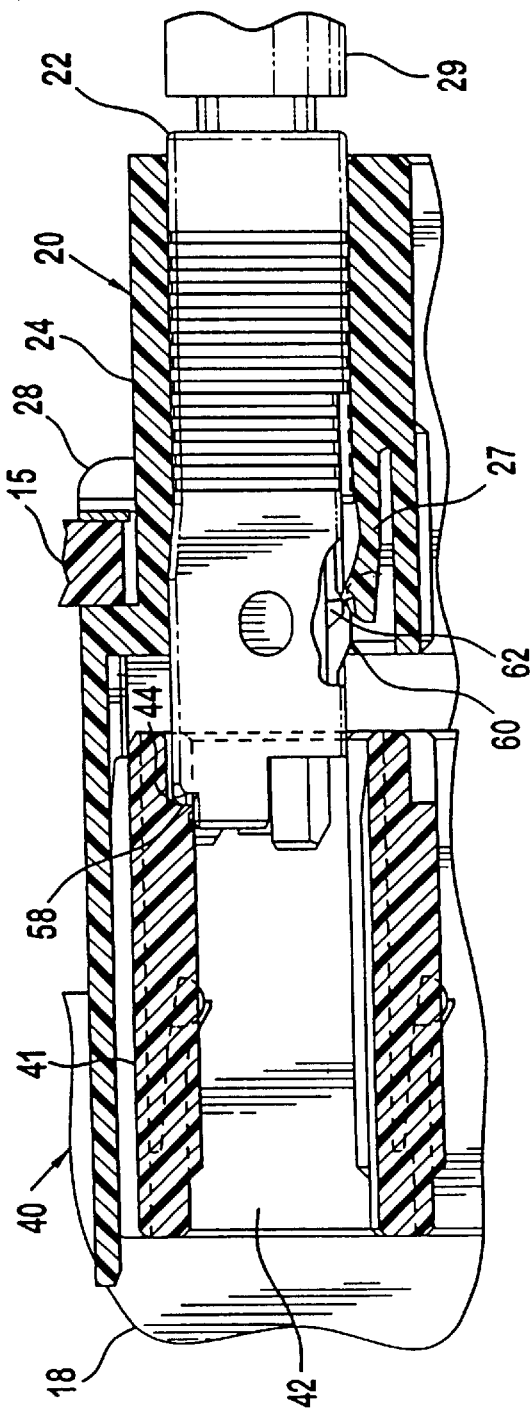

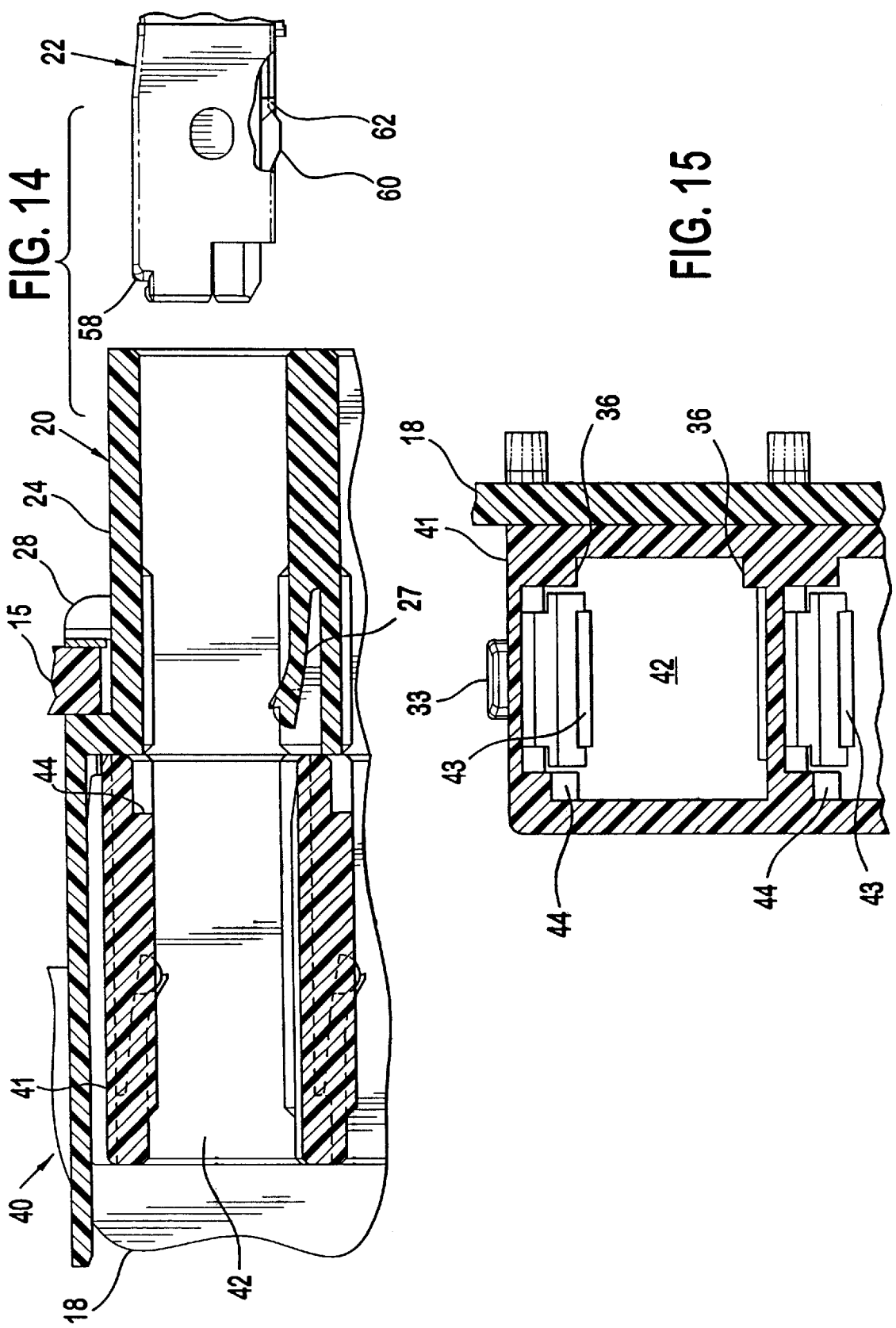

OPTICAL CONNECTOR HAVING MULTIPLE MODULAR HOUSINGS

BACKGROUND

This invention is related to an optical interconnection system and more particularly to a modular system for interconnecting a plurality of array connectors.

Along with the ever increasing need for communications systems comes a need for more input and output ports in communications equipment. The use of fiber optics has increased the available bandwidth per line. Since increasing the number of lines within a given amount of space is often desirable, the need for higher density interconnections arises. Increased optical interconnection density has been achieved by providing array interconnections within a single connector. Once such example is AMP Incorporated's MPX product. The MPX product is shown in AMP catalog No. 889429 dated February 1999. This product features an array ferrule containing a plurality of fiber end faces positioned between a pair of alignment pins or openings. While this product has served to increase the number of optical interconnections in a given space, it has limitations. The number of interconnections is limited by the outer dimensions of the connector housing and alignment limitations of the array ferrule.

PCT Publication WO 98 in/00741 shows an optical connector having two complementary connector halves. Each connector half has an array ferrule for receiving a plurality of optical fibers. The ferrule is surrounded by an inner housing which is surrounded by an outer housing. The ferrule is arranged within the inner housing such that it is biased forward by a spring force. The inner housing is freely movable between two stops within the outer housing. The inner housing has latching means for latching with the inner housing of the complementary connector half. The outer housing is movable over the inner housing and has releasing means for opening the latching means of the inner housing. The outer and inner housings can be designed to be hermaphroditic.

U.S. Pat. Nos. 5,542,015 and 5,764,834 show an optical fiber connector having a jack mounted to a motherboard and a plug mounted to daughter board. The plug has a slidable insert retained by thrust lances against the shoulder of the plug housing such that the insert can be inserted into a cavity of the jack. Latches of the jack serve to latch onto ribs of the plug insert so as to butt a ferrule of the plug against a ferrule of the jack. Further insertion of the insert into the jack causes the ribs to release the thrust lances of the plug insert such that the insert springs rearward allowing the plug housing to slide forward without spring resistance.

Where it is desirable to increase the number of interconnections beyond the limits of an array ferrule in a small space, a problem exists in effecting alignment and reliable interconnection. Also, many applications require the interconnection to occur between circuit boards such as between backplane and daughter boards. These applications require connector float in several directions which further complicates the alignment problems discussed above. These applications also present a problem in effectively latching the assemblies in a mated condition to achieve reliable optical interconnections while maintaining the connector float required.

SUMMARY

It is therefore an object of the present invention to provide a reliable interconnection system capable of connecting a plurality of optical signals.

This and other objects have been achieved by providing an interconnection system having a backplane connector mounted to a backplane substrate. The backplane assembly features a coupling housing having a plurality of connector receiving passageways each having a latch extending into each passageway for securing an optical connector therein. Passageways of a complementary coupling housing feature a release projection for engaging the plurality of connectors and for releasing them from the latches when the coupling housings are in a mated condition.

BRIEF DESCRIPTION OF THE DRAWINGS

The invention will now the described by way of example with reference to the accompanying figures of which:

FIG. 2 is a three-dimensional view of the backplane assembly.

FIG. 3 is a three-dimensional view of the coupling housing of FIG. 2 secured to the backplane substrate.

FIG. 7 is a cross-sectional view of the optical interconnection system taken along the line 7—7 of FIG. 1.

FIG. 8 is an enlarged partial cross-sectional view similar to that of FIG. 7 showing a single connector receiving passageway.

FIG. 9 is enlarged partial cross-sectional view similar to that of FIG. 8 having both optical connectors latched into their respective coupling housings and to each other.

FIG. 10 is an enlarged partial cross-sectional view similar to that of FIGS. 8 and 9 where in the coupling housings are urged apart.

FIG. 11 is a cross-sectional view taken along the line 11—11 of FIG. 9.

FIGS. 12–14 are enlarged partial cross-sectional views of a release sequence wherein one coupling housing has an optical connector loaded into the connector receiving passageway and the complementary connector receiving passageway is unloaded.

FIG. 15 is a cross-sectional view taken along the line 15—15 of FIG. 12.

DETAILED DESCRIPTION OF THE PREFERRED EMBODIMENT

Figure 1:
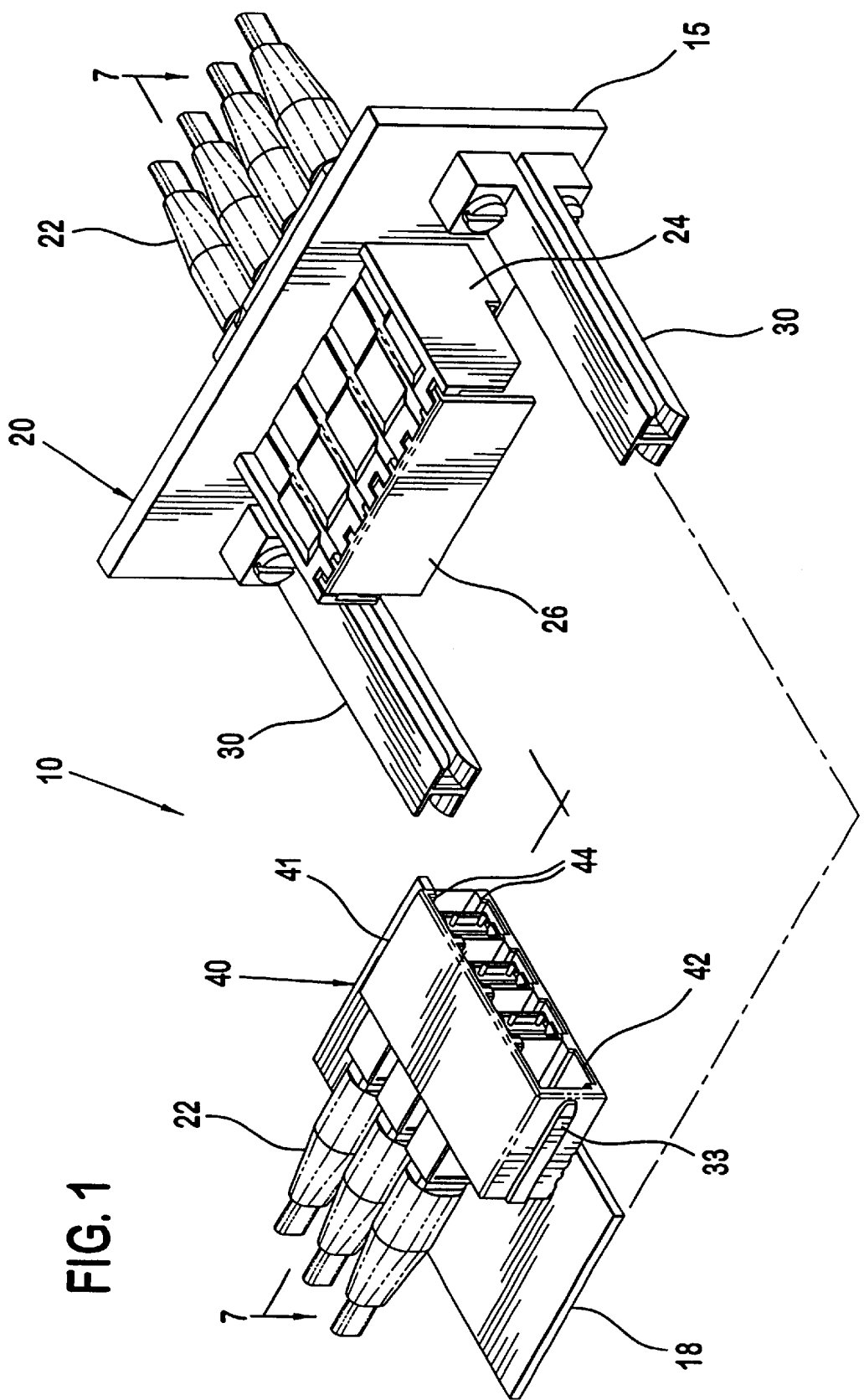
FIG. 1 is a three-dimensional view of the optical interconnection system according to the present invention.

The invention will first be described generally with reference to FIG. 1. The optical interconnection system 10 includes a backplane assembly 20 and a daughter board assembly 40. Major components of the backplane assembly 20 include a backplane substrate 15, a coupling housing 24 mounted to backplane assembly 20, a plurality of optical connectors 22 secured in the coupling housing 24, and guide rails 30 mounted to the backplane substrate 15. Major components of the daughter board assembly 40 include the coupling housing 41 mounted to the daughter board 18. The plurality of optical connectors 22 is secured into coupling housing 41.

Each of the major components will now be described in greater detail with reference to FIG. 1–4 and 7. Referring first to FIGS. 2 and 3, the backplane assembly 20 will now be described in greater detail. The backplane substrate 15 is provided with the connector receiving openings 16 having a notch 17. The guide rails 30 are positioned along opposite sides of the connector receiving opening 16 and extend outward from the backplane substrate 15. The guide rails 30 could be optionally removed in applications that do not require prealignment of the daughter board 18 to the backplane assembly 20. The coupling housing 24 has a shutter 26 disposed along a mating end. A narrow portion 35 is provided at a rear end and a keying projection 21 extends along the narrow portion 35. A plurality of connector receiving passageways 25 extend from the rear end partially through the coupling housing 24 toward the mating end. At the mating end, a pair of side walls 31 define a coupling housing receiving area 38 which is in communication with each connector receiving passageway 25. Guide slots 37 extend along an inner surface of each side wall 31. Inside each passageway 25, a latch 27 extends from a wall toward the mating end as best shown in FIG. 7. A retaining clip 28 features a coupling receiving opening 32 and a plurality of retention barbs 34 extending into the coupling receiving opening 32. An optical connector 22 is disposed inside each connector receiving passageway 25.

Figure 4:
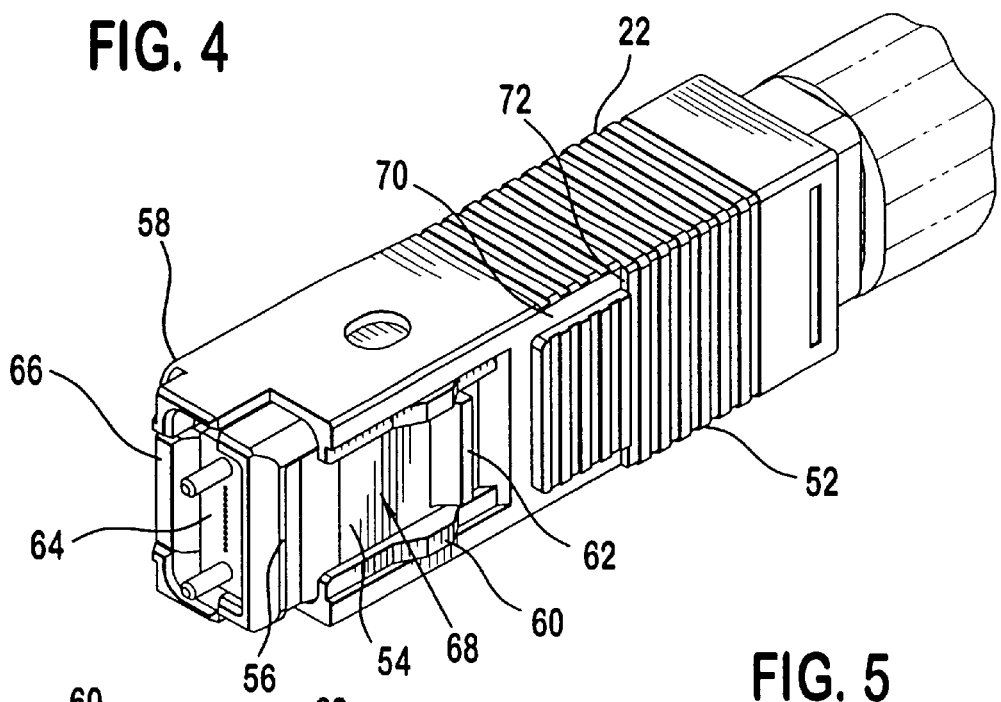
FIG. 4 is a three-dimensional view of an optical connector used in the system of FIG. 1.
Figure 5:
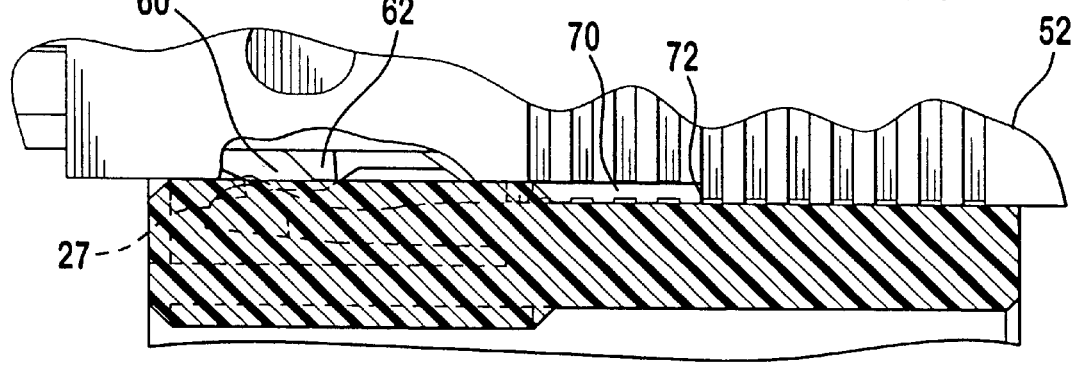
FIG. 5 is a partial enlarged view of the optical connector of FIG. 4.
Figure 6:
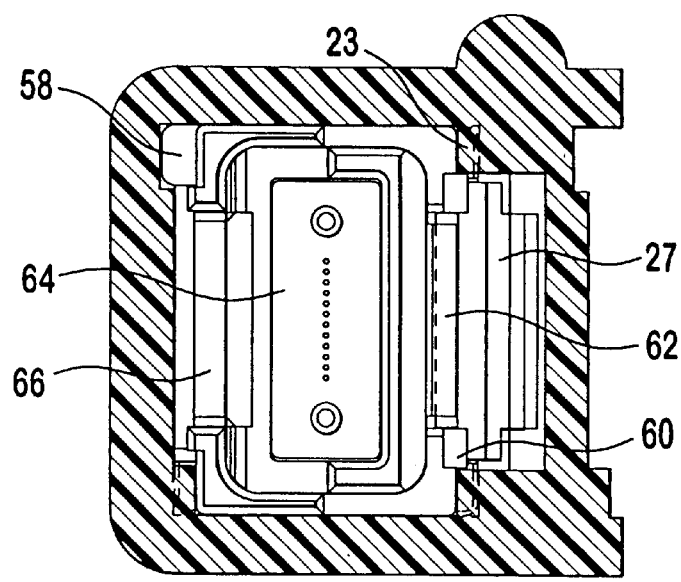
FIG. 6 is a partial end view showing a loaded connector receiving passageway of the coupling housing.

The optical connector 22 will now be described in greater detail with reference to FIGS. 2 and 4. The optical connector 22 includes an outer housing 52 having a wall 58 extending upward from a corner near the mating end. A plurality of recesses 70, each having a shoulder 72, is formed along other corners and extends to the mating end. A pair of cams 60 extend from a surface of the outer housing 52 and are positioned along a window 68 formed in the surface. An inner housing 54 is disposed inside the outer housing 52. The inner housing 54 is movable within the outer housing 52 such that the outer housing 52 is slidable over the inner housing 54 in a limited range. The latch 66 extends from the inner housing 54 to a free end near the mating end. The first latching shoulder 56 is disposed along a surface of the inner housing 54 opposite the latch 66. A second latching shoulder 62 is positioned behind the first latching shoulder 56, within the window 68, and near the release cams 60 of the outer housing 52. An array ferrule 64 is disposed within the inner housing 54 and is biased toward the mating end. The array ferrule 64 is capable of receiving a plurality of optical wave guides such as optical fibers typically entering the optical connector 22 from a cable 29. The design of the optical connector 22 is hermaphroditic. Therefore, each optical connector 22 will mate with the similar optical connector 22 without the need for separate male and female housings or any type of coupling receptacle or device.

Referring again to FIG. 1, the daughter board assembly includes a coupling housing 41 mounted to daughter board 18. A pair of guide projections 33 extends along opposite sides of the coupling housing 41. The guide projections 33 have two tapered lead in surfaces near the mating end. A plurality of optical connectors 22 is disposed in connector receiving passageways 42. It should be noted here that the optical connectors 22 are mounted in an upright or vertical orientation to minimize the board real estate occupied by the coupling housing 41. The connectors mount into connector receiving passageways having a generally rectangular lateral cross-section with a first axis 70 and second axis 72. (FIG. 3) The first axis 70 is greater in length than said second axis 72. The passageways are vertically aligned such that said first axis of each passageway is parallel to the first axis of all other passageways. Those reasonably skilled in the art will appreciate that the vertical orientation may be replaced by a horizontal orientation in applications where minimizing height is a greater concern than minimizing board real estate occupied. The connector receiving passageways 42 extend through the coupling housing 41 from a mating end to a rear end. Each passageway 42 contains a latch 43 extending from a wall toward the mating end (FIG. 7). A release projection 44 extends along a corner of each passageway 42 to the mating end. Since the optical connectors 22 shown here are hermaphroditic, the detailed description of this component will not be repeated. It should be understood however by those reasonably skilled in the art that the hermaphroditic optical connectors 22 could optionally be replaced by complementary male and female optical connectors placed in respective coupling housings 24, 41.

Assembly of the backplane and daughter board assemblies 20, 40 will now be described in greater detail with reference to FIGS. 2–7. The backplane assembly 20 is formed by first mounting guide rails 30 to the backplane substrate 15 using suitable fasteners. The shutter 26 is mounted to the mating end of the coupling housing 24 utilizing a snap on hinge arrangement and by a biasing means such as a spring to urge the shutter 26 toward a closed positioned as shown in FIG. 2. The narrow portion 35 of the coupling housing 24 is inserted into the connector receiving opening 16 such that the keying projection 21 is aligned with the notch 17. The retaining clip 28 is slid over the narrow portion 35 from the opposite side of the backplane substrate 15 such that retention barbs 34 engage the narrow portion 35 to secure the coupling housing 24 to the backplane substrate 15. It should be noted here that the connector receiving opening 16 is slightly larger than the narrow portion 35. Also, the retaining clip 28 is forced onto the narrow portion 35 and finally positioned at a location on the narrow portion 35 which is slightly spaced away from the back side of the backplane substrate 15. The opening size and retaining clip location are selected to allow the coupling housing to float in axial and transverse directions. A plurality of optical connectors 22 is loaded into the connector receiving passageways 25 from the rear end near the narrow portion 35. Each optical connector 22 is secured into its respective connector receiving passageway 25 by engagement of the second latching shoulder 62 with the latch 27. Engagement of the latch 27 with the second latching shoulder 62 prevents the optical connector 22 from being removed by a pulling force on the cable 29. The optical connector 22 is prevented from exiting the mating face by the engagement of a stop projection 23 of the coupling housing 24 with the shoulder 72.

The daughter board assembly 40 is formed by first mounting the coupling housing 41 to the daughter board substrate 18. Each optical connector 22 is inserted into a respective connector receiving passageway 42 until it is secured by engagement of the latch 43 with the second latching shoulder 62. This engagement prevents the optical connector 22 from being removed by a pulling force on the cable 29. The optical connector 22 is prevented from exiting the mating end by engagement of the stop projection 36 of the coupling housing 41 with the shoulder 72.

Mating and unmating of the backplane and daughter board assemblies 20, 40 will now be described in greater detail with reference to FIGS. 7–11. Referring first to FIG. 7, each assembly 20, 40 is shown having an optical connector 22 secured in a respective coupling housing 24, 41. The daughter board 18 is first inserted into the guide rails 30. As the daughter board assembly 40 is urged down the guide rails 30, the coupling housing 41 engages and urges the shutter 26 into an open position. The guide projections 33 enter guide slots 37 of the side walls 31. Lead in tapered portions of the guide projections 33 serve to roughly align the coupling housings 41, 24. The daughter board assembly 40 is urged further toward the backplane assembly 20 causing the optical connectors 22 to engage and latch together as shown in FIG. 8. Although not visible in FIG. 8, the latch 66 of each optical connector 22 (FIG. 2) is in engagement with the first latching shoulder 56 of the opposite optical connector 22. The mating ends of each ferrule 64 are now touching each other. Latches 27, 43 are engaged with respective second latching shoulders 62. FIG. 9 shows the assemblies 20, 40 in a fully mated position. As the assemblies 20, 40 are urged further toward each other the release projection 44 pushes on the outer housing 52 of the optical connector 22 mounted in the backplane assembly coupling housing 24. The outer housing 52 is therefore urged rearward causing the release cams 60 to engage to latch 27 and release it from the second latching shoulder 62. The optical connectors 22 are latched to each other while one is latched to the daughter board coupling housing 41 and the other is free from the backplane coupling housing 24. This allows the optical connectors 22 to move within the mated backplane and daughter board assemblies 20, 40 without interrupting the optical connection therebetween.

Turning now to FIGS. 10 and 11, an unmating sequence will be described. As the daughter board assembly 40 is urged away from the backplane assembly 20, latches 66 remain engaged with respective first latching shoulders 56 and the optical connector 22 inside the backplane assembly coupling housing 24 is pulled back toward the mating end as shown in FIG. 10. The inner housing 54 and the outer housing 52 move together such that release cams 60 first deflect the latch 27 and then the second latching shoulder 62 engages the latch 27 as it comes down off the release cams 60. The latch 27 once again holds the optical connector 22 inside the coupling housing 24 as was shown in FIG. 8.

The shutter 26 serves to block light emanating from the ferrules 64. Therefore, when the daughter board assembly 40 is removed from the backplane assembly 20, the shutter is in a closed position as shown in FIG. 2 to prevent eye damage to a user looking into the backplane assembly 20. In the event that the coupling housing 41 of the daughter board assembly 40 is not fully loaded with optical connectors 22 a problem exists in that the shutter 26 will be in an opened position as shown in FIG. 8 allowing light to pass from an optical connector 22 in the backplane assembly 20 through a vacant passageway 42 and out of the daughter board assembly 40. A safety feature of the present invention that addresses this problem will now be described with reference to FIGS. 12–15. Beginning at FIG. 12, a daughter board coupling housing 41 having an unloaded passageway 42 is urged toward a fully loaded backplane assembly 20 having an optical connector 22 secured in passageway 25 of the coupling housing 24. The release projection 44 of the daughter board coupling housing 41 engages the end of the wall 58 of the optical connector 22. Referring now to FIG. 13, as the daughter board assembly 40 is urged further toward the backplane assembly 20, a backward force is applied to the wall 58 by the release projection 44 causing the outer housing 52 to move backward over the inner housing 54 causing the release cams 60 to engage the latch 27. Further urging causes the release cams 60 to pass the latch 27 and disengage to it from the second latching shoulder 62. Once the latch 27 is released, the force being applied to the daughter board assembly 40 in order to overcome the caming action ejects the optical connector 22 out of a the back end of the coupling housing 24 as shown in FIG. 14.

An advantage of the present invention is that a plurality of optical array connectors can be simultaneously mated between backplane and daughter board assemblies.

An additional advantage of the present invention is that when the backplane and daughter board assemblies are in a mated condition, the optical connectors are latched to each other while being free to move within the mated backplane and daughter board assemblies.

An additional advantage of the present invention is that the optical array connectors are positioned along the daughter board to minimize the real estate occupied on the board.

An additional advantage of the present invention is that the shutter is provided along the backplane connector assembly to minimize the safety hazard of light escaping the assembly.

An additional advantage of the present invention is that optical connectors positioned within the backplane assembly opposite a vacant daughter card passageway will be ejected during mating to avoid the safety hazard of light escaping the mated assembly.

It should be understood by those reasonably skilled in the art that minor variations to the embodiments presented here are intended to be within the spirit of the invention. For example, each of the coupling housings 24, 41 could be modules of a larger optical connector assembly or modules of a hybrid electrical and optical connector assembly. They could also be a part of integral hybrid connector assemblies. Also, features of the assemblies 20, 40 could be interchangeable between the backplane assembly 20 and the daughter board assembly 40 as long as the features remain complementary. The invention is therefore intended to be limited only by the scope of the appended claims.

What is claimed is:

1. An optical interconnection assembly comprising:

an optical connector having an inner housing slidably mounted within an outer housing, the inner housing having a latch and a first shoulder disposed near a mating end, a second shoulder disposed behind the first shoulder, and a release cam disposed along an outer surface of the outer housing proximate the second shoulder;

a first coupling housing having a plurality of first passageways, each passageway having a latch extending into releasable engagement with the second shoulder of a respective optical connector and being engagable by the release cam, and a release projection extending along at lease one of said first passageways;

a second coupling housing, said second housing having a plurality of second passageways; and at least one complementary connector secured in one of said second passageways, said complementary connector comprising an inner housing slidably disposed within an outer housing, said inner housing further comprising a latching shoulder for receiving a latch extending from said second passageway of said second coupling housing and said outer housing further comprising a release cam engaging said latch proximate said shoulder;

wherein upon mating of said first coupling housing with said second coupling housing, said release projection engages said outer housing of said complementary connector urging said release cam past said latch to release the complementary connector from said second coupling housing.

2. The assembly as set forth in claim 1, wherein said second housing further comprises a shutter being hingably mounted along a mating end of said second housing.

3. The assembly as set forth in claim 1, wherein said second housing further comprises a narrow portion profiled to pass through an opening in a substrate.

4. The assembly as set forth in claim 3, wherein said second housing further comprises a keying projection extending along the narrow portion.

5. The assembly as set forth in claim 3, wherein said second housing further comprises a retaining clip secured to the narrow portion and engaging the substrate.

6. The assembly as set forth in claim 5, wherein said second housing further comprises at least one retention barb in engagement with the narrow portion.

7. An optical interconnection system comprising:

a first coupling housing having a plurality of passageways each for receiving a connector, each passageway having a latch for securing the connector therein and a release projection extending along the passageway, a second coupling housing being matable with the first coupling housing and having a plurality of second passageways, each of the second passageways having a second latch for securing a complementary connector therein each complementary connector having a cam disposed on an outer housing, the outer housing being engageable with the release projection of the first coupling housing upon mating to urge the cam past the latch for releasing the complementary connector from the second coupling housing.

8. The optical interconnection system of claim 7 further comprising a shutter mounted on a mating end of the first coupling housing.

9. The optical interconnection system of claim 7 wherein the first coupling housing further comprises a narrow portion.

10. The optical interconnection system of claim 9 further comprising a keying projection extending along the narrow portion.

* * * * *